United States Patent [19]
Hobrath

[11] Patent Number: 5,909,887
[45] Date of Patent: Jun. 8, 1999

[54] MOWER SULKY

[75] Inventor: Gerald Hobrath, Brunswick, Ohio

[73] Assignee: MTD Products Inc, Valley City, Ohio

[21] Appl. No.: 08/756,541

[22] Filed: Nov. 26, 1996

Related U.S. Application Data

[63] Continuation of application No. 08/176,249, Jan. 4, 1994, abandoned.

[51] Int. Cl.[6] .................................................. B62D 63/00
[52] U.S. Cl. ........................ 280/32.7; 172/257; 172/433; 280/493; 280/760
[58] Field of Search .................................. 280/32.7, 14.2, 280/24, 204, 202, 492, 493, 494, 47.11, 760, 769, 292, 63; 180/11, 14.1, 20, 332, 900; 172/257, 256, 330, 433, 435

[56] References Cited

U.S. PATENT DOCUMENTS

| | | | |
|---|---|---|---|
| 224,390 | 2/1880 | Cole | 280/32.7 |
| 800,317 | 9/1905 | McLaughlin et al. | 280/32.7 |
| 825,872 | 7/1906 | Simons | 280/32.7 |
| 1,539,644 | 5/1925 | Cady | 280/32.7 |
| 2,218,064 | 10/1940 | Amsbury | 280/32.7 |
| 2,659,287 | 11/1953 | Jouette | 172/257 |
| 3,175,846 | 3/1965 | Arbaugh | 280/492 |
| 3,398,279 | 8/1968 | Jacobs | 280/492 |
| 3,909,042 | 9/1975 | Miller | 280/493 |
| 3,998,471 | 12/1976 | Lutchemeier | 280/492 |
| 4,192,525 | 3/1980 | Clark | 280/32.7 |
| 4,989,351 | 2/1991 | Shear | 280/32.7 |
| 5,413,364 | 5/1995 | Hafendorfer | 280/32.7 |
| 5,468,007 | 11/1995 | Kanerva | 280/492 |
| 5,685,554 | 11/1997 | Poxleitner | 280/493 |

FOREIGN PATENT DOCUMENTS

| | | | |
|---|---|---|---|
| 0234421 | 7/1964 | Austria | 172/433 |
| 0947903 | 7/1949 | France | 280/32.7 |
| 1358495 | 3/1964 | France | 280/32.7 |
| 0180588 | 9/1962 | Sweden | 280/49.3 |

Primary Examiner—Anne Marie Boehler
Attorney, Agent, or Firm—Emerson & Associates; Roger D. Emerson; John M. Skeriotis

[57] ABSTRACT

A sulky for a self propelled lawn mower, the sulky being interconnected by a pivot frame and a horizontal pivot to the mower frame, and a vertical pivot between the sulky frame and wheels in order to retain the operator in a constant position in respect to the mower under all operator conditions.

6 Claims, 3 Drawing Sheets

MOWER SULKY

This application is a continuation of Ser. No. 08/176,249 filed Jan. 4, 1994 abandoned.

FIELD OF THE INVENTION

This invention relates to an improved sulky for self powered lawn mowers.

BACKGROUND OF THE INVENTION

Self powered lawn mowers have been in use for a significant period of time. Typically, these mowers comprise a frame having power driven wheels, rearwardly extending handlebars, and a mowing deck. By selectively manipulating the controls on the handlebars, the operator can cause this self propelled mower to selectively go forward or reverse, turn, and accomplish basic mowing functions. Examples include U.S. Pat. No. 4,920,734 and U.S. application Ser. No. 08/047,101 filed Apr. 14, 1993. In certain applications, for example lawn care professionals, the operation of these mowers is quite tiring due to the fact that the operator must continually walk behind such lawn mowers. For this reason, sulkies may be provided, which sulkies, when interconnected to the lawn mower frame, allow the operator to be propelled by the lawn mower, thus eliminating the necessity of his walking behind same. Examples of commercial sulkies include the sulky marketed under the name Velke as reflected in Velke U.S. Pat. No. 5,004,251 issued Apr. 2, 1991, Sulky Apparatus Attachable To A Self Propelled Power Mower and Herr U.S. Pat. No. 3,485,314, Article Caring Vehicle With Optional Storable Riding Attachment. These prior art sulkies are advantageous in that they allow the operator to ride in relative comfort behind the self propelled mower. The problem with them is, however, when a turn is accomplished, both of them severely inconvenience the operator. This inconvenience occurs because the operator is displaced from his positioning directly behind the handlebars. Further, in at least the Velke patent, it is possible for the operator to be forced off the apparatus due to a jackknifing effect. This limits the utilization and convenience of these prior art sulkies.

OBJECTS AND SUMMARY OF THE INVENTION

It is an object of the present invention to provide for a convenient, useable sulky.

It is another object of the present invention to provide for an adaptable sulky.

It is yet another object of the present invention to retain the operator in an operative position in respect to the handlebars under all operative conditions of the sulky.

It is still another object of the present invention to increase the comfort level for operators of powered lawn mowers.

It is also an object of the present invention to provide for an easily removable sulky.

It is yet a further object of the present invention to increase the usability of sulkies for lawn mowers.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

Figure 1:
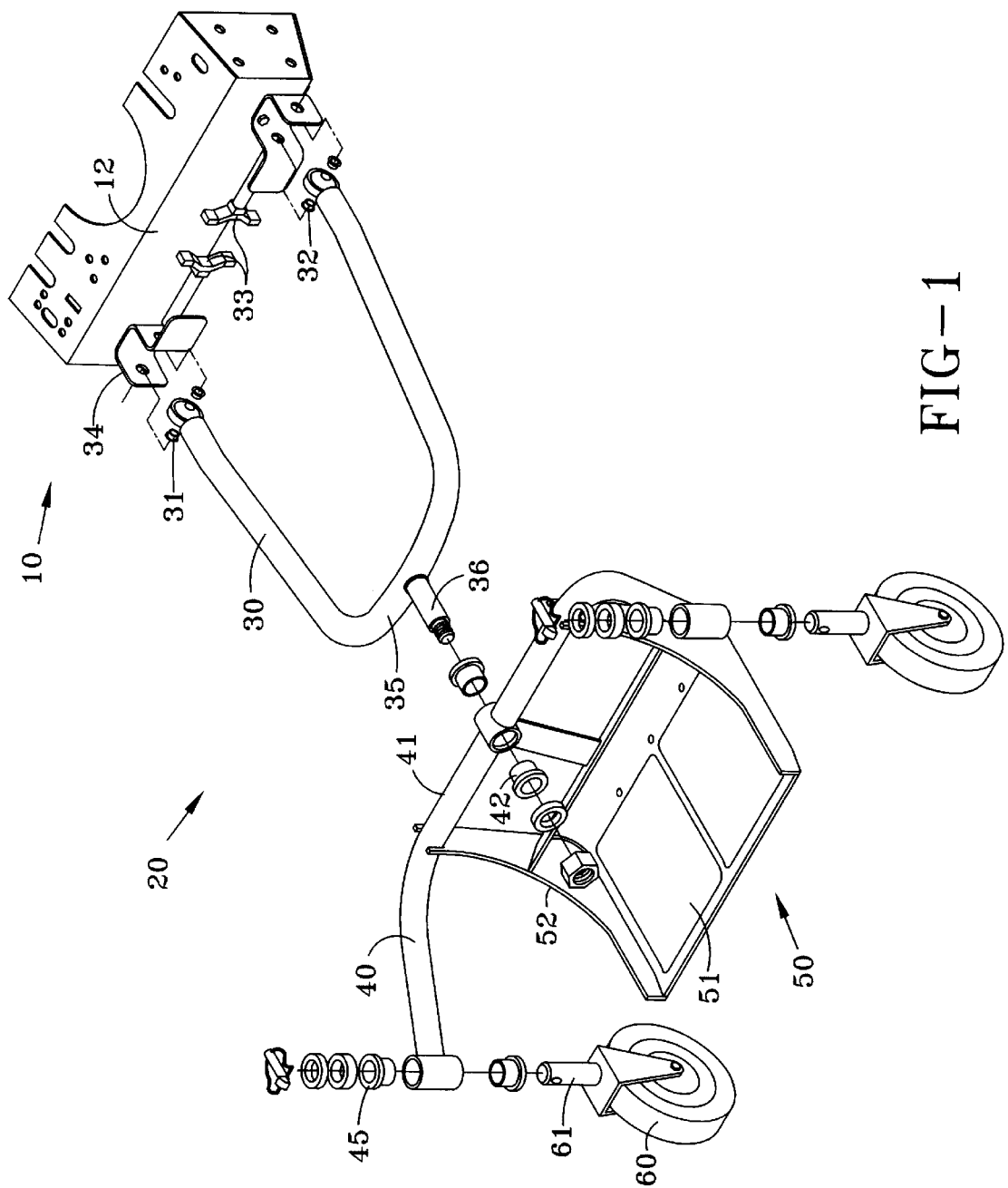
FIG. 1 is a respective view of a sulky in a partially disassembled plan view incorporating the invention of the application.
Figure 2:
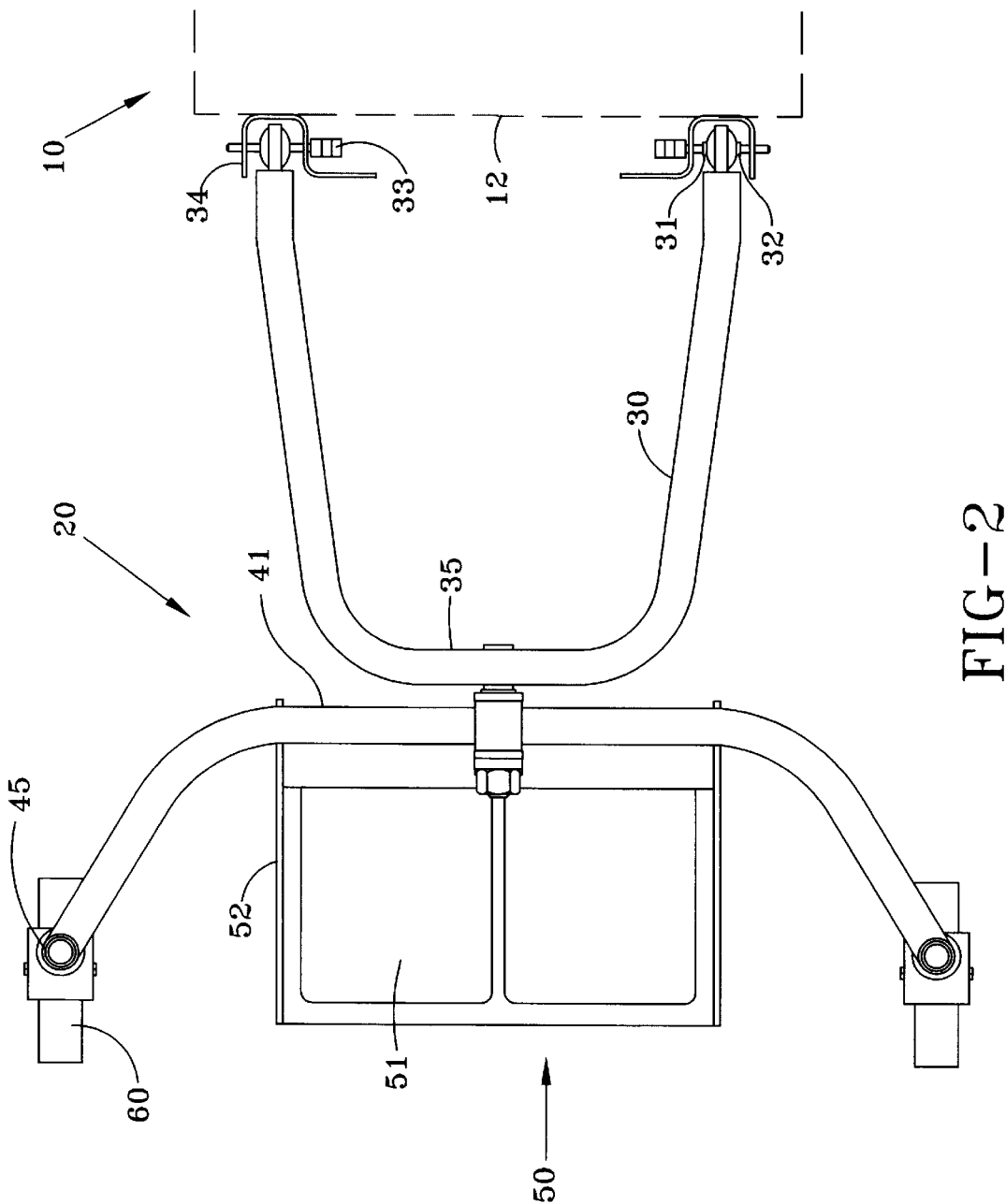
FIG. 2 is a downward looking view of the sulky of FIG. 1 incorporating the invention of the application; and, FIG. 3 is a side view of the sulky of FIG. 1 incorporating the invention of the application.
Figure 3:
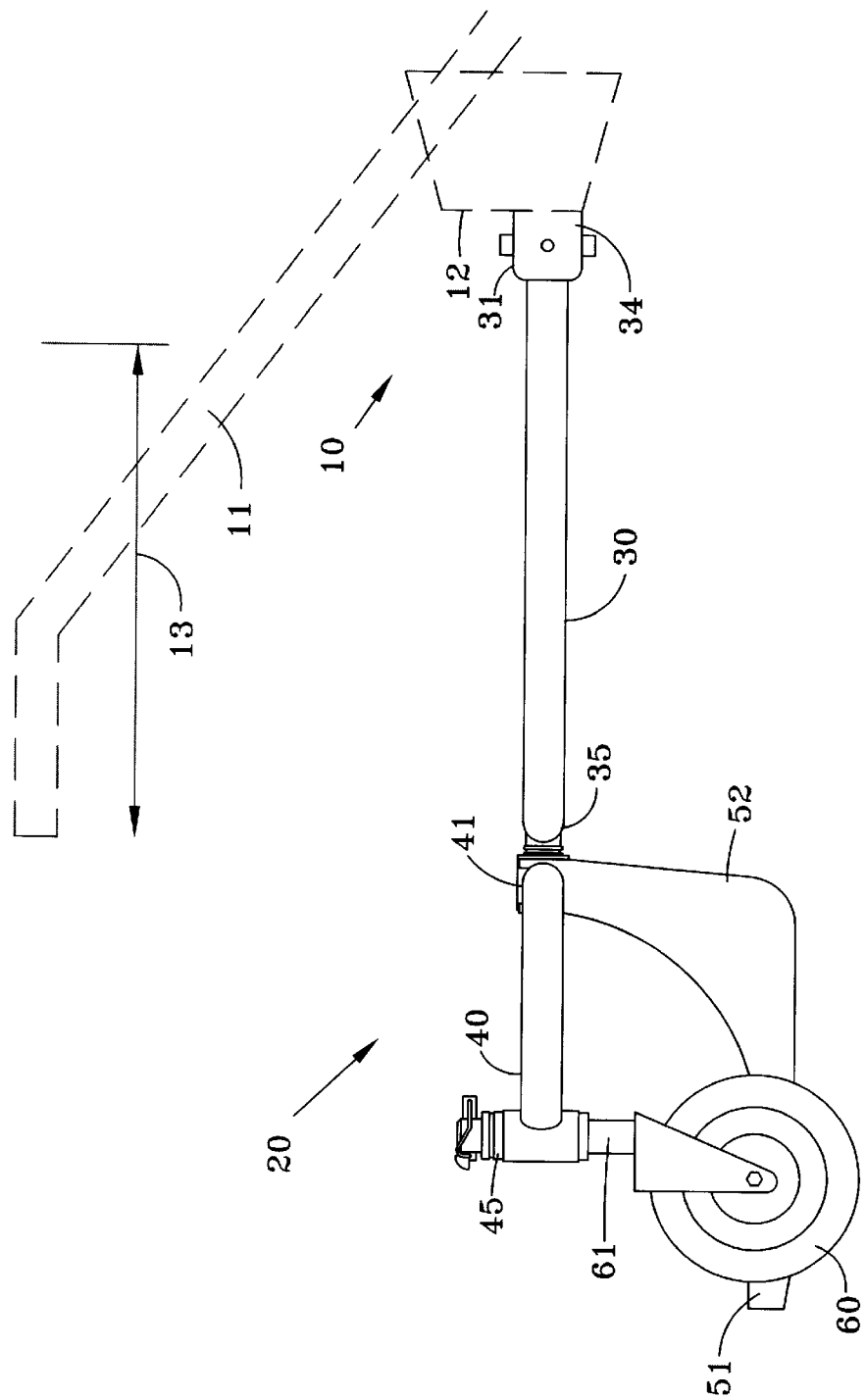

This invention relates to a sulky for powered devices. The invention will be described in its preferred embodiment of a sulky for a self powered commercial lawn mower.

The lawn mower disclosed is a Cub Cadet mower. This device includes a frame 10 which supports an engine (not shown) and a forwardly extending mower deck (not shown). The frame itself is supported on two pairs of fore and aft displaced wheels so as to provide a constant support for the mower frame 10 (wheels not shown). The rear wheels are power driven by a hydrostatic transmission to the engine. The direction and speed of the lawn mower is under the control of the operator by the manipulation of the handlebars 11 together with the controls thereon. In this mower, the speed and direction are controlled by two clutches, one for the left rear wheel and the other for the right rear wheel. This allows for turns to be accomplished without physically moving the mower via the handlebars. This particular mower is given as an example. Other self powered devices could be substituted.

The invention of this application relates to the sulky 20. This sulky 20 includes a pivot frame 30, a sulky frame 40, and a sulky stand 50.

The pivot frame 30 is for interconnecting the front section 41 of the sulky frame 40 to the back 12 of the mower frame while simultaneously providing a horizontal "X" axis pivot that allows the sulky frame 40 to move angularly upwards and downwards in respect to the mower frame 10. The pivot frame 30 in addition spaces the front section 41 of the sulky frame by the appropriate distance from the back 12 of the mower frame 10. The appropriate distance is determined by operator comfort in respect to the distance 13 that the handlebars extend rearwardly of the back 12 of the mower frame. This provides for operator comfort when the operator is on the sulky stand 50.

In the preferred embodiment of the invention, the horizontal "X" axis pivot is at the front end 31 of the pivot frame 30. The particular pivot disclosed are ball ends 32 on the front end of the pivot frame 30, which ball ends pivot about removable pins 33 to two brackets 34 which are interconnected to the back 12 of the mower frame 10. The pins 33 allow the pivot frame 30 to pivot about the brackets 34, thus allowing the sulky stand 50 to float upwards and downwards in respect to the mower frame 10. The ball ends 32 allow for compensation for any angular misalignment between the holes in the brackets 34 and the holes in the ball ends 32, thus facilitating assembly. The removable pins 33 allow for easy removal of the sulky for use of the mower without the sulky, transport, storage, etc.

To increase the side to side stability of the horizontal "X" axis pivot, it is preferred that the brackets 34 be at least two in number and widely spaced as shown. This maximizes the side to side stability between the mower frame 10 and the sulky stand 50. Due to the preferred locating the horizontal "X" axis pivot on the back 12 of the mower frame 10, the longitudinal angular pivoting of the sulky stand 50 is minimized for a sulky 20 having a given length (for example in contrast to locating the horizontal "X" axis pivot at the back end 35 of the pivot frame 30 with the front end 31 fixedly interconnected to the back 12 of the mower frame 10). This minimization of the longitudinal angular pivoting is preferred for operator convenience and comfort.

In the preferred embodiment disclosed, the front section 41 of the sulky frame is interconnected to the back end 35 of the pivot frame 30 by an optional horizontal "Y" axis pivot. This horizontal "Y" axis pivot allows the sulky stand 50 to float angularly sideways of the mower frame 10, thus reducing the torsion on the pivot frame 30 and sulky frame 40. This increases the service life of the sulky 20 for components of the given size.

The preferred "Y" axis pivot disclosed is a pin 36 extending longitudinally backwards off of the back end 35 of the pivot frame in combination with a bearing 42 in a hole on the front section 41 of the sulky frame 40. The combination of this pin 36 and bearing 42 allow the sulky frame 40 to laterally rotate in respect to the pivot frame 30. The pin 36 and bearing 42 in addition interconnects the sulky frame 40 to the pivot frame 30 so that the sulky frame 40 is interconnected to the mower frame 10 for travel over the ground. Note that this pin 36 and bearing 42 in addition interconnect the sulky frame 40 to the pivot frame 30 during turning of the mower. The pin 36 and bearing 42 combination should be sized in recognition of these high angular forces.

The sulky frame 40 supports the sulky stand 50 for travel over the ground, in addition to interconnecting the sulky stand 50 to the pivot frame 30 and thence the mower frame 10. The particular sulky frame 40 disclosed accomplishes this by two widely spaced wheels 60 on either side of the sulky stand 50. The significant lateral spacing of these wheels provides for a solid support of the sulky stand 50 over uneven ground. Since the sulky frame 40 does not longitudinally angularly shift in respect to the mower frame 10, the wheels 60 are interconnected to the sulky frame 40 by a vertical "Z" axis pivot. This vertical "Z" axis pivot allows the wheels to rotate in respect to the sulky frame 40, thus aligning themselves to the direction of movement of the sulky frame 40 over the ground.

The particular "Z" axis pivot disclosed is accomplished by two off center pins 61 on the wheels in combination with bearings 45 at either lateral side of the sulky frame 40. By offsetting the pin 61 forward in respect to the axis of rotation of the wheels 60, a measure of stability is provided for the wheels. This is preferred. Note that if the horizontal "Y" axis pivot was omitted, it would be possible to use a single wheel 60; two wheels would not be needed to provide any lateral stability for the sulky stand 50. A single wheel could also be successfully utilized with a stand 51 below the wheel rotational axis.

The sulky stand 50 provides the physical support for the operator. In the particular embodiment disclosed, this is provided by a single flat foot stand surface 51 which is fixedly interconnected to the sulky frame 40 by certain side pieces 52. The surface 51 is preferably sufficiently wide and long such that the largest sized operator could be accommodated. Other operator supports could also be utilized, such as an operator seat. This seat would further provide operator comfort.

In use, the operator locates the mower on a flat surface and interconnects the sulky 20 to the back 12 of the mower frame 10 by the pins 33. Any slight angular misalignment is compensated for by the ball ends 32 of the pivot frame 30. The operator then starts the mower and stands on the surface 51 of the sulky. When thus positioned, the operator is located directly behind all of the mower controls which are located on the handlebars 11. The operator then engages the controls to operate the mower with the power driven mower pulling the operator on the sulky 20 across the ground. Whether the operator is going straight or turning the mower, the operator maintains his same relative position in respect to the handlebars 11. This is true whether the operator is going straight, reverse, or turning. This constant location facilitates operator control of the lawn mower as well as operator comfort. In that in the preferred embodiment disclosed, the horizontal "X" axis pivot is located far forward, any longitudinal angular shifting of the sulky stand 50 is minimized. This further assists the operator in control of the mower. If the operator wants to remove the sulky 20 for unfettered manual operation, transportation, etc., a quick pull on the removable pins 33 drops the sulky until next time.

Although the invention has been described in its preferred embodiment with a certain degree of particularity, it is to be understood that numerous changes can be made without deviating from the invention as hereinafter claimed.

What is claimed:

1. A sulky for use with an associated self-propelled apparatus having a frame, said sulky comprising:

a sulky frame;

a sulky stand supported by said sulky frame;

a wheel connected to said sulky frame to support said sulky frame and said sulky stand for travel; and, a pivot frame for connecting said sulky stand to the frame, said pivot frame having first and second ball ends receivable by first and second brackets for connection to the apparatus frame, said first ball end being detachably connected to said first bracket by a first removable pin disposed through said first ball end and said first bracket, said second ball end being detachably connected to said second bracket by a second removable pin disposed through said second ball end and said second bracket, said pivot frame being vertically pivotable about said first removable pin in said first bracket and said second removable pin in said second bracket, said pivot frame further having a pin extending longitudinally backwards off a back end of said pivot frame, said pin being receivable by a hole in said sulky frame, said pin being supported in said hole in said sulky frame by a bearing, said sulky frame being rotatably connected to said pivot frame by said pin.

2. A sulky for use with an associated self-propelled apparatus having a frame, said sulky comprising;

a sulky frame;

a sulky stand supported by said sulky frame;

a wheel connected to said sulky frame to support said sulky frame and said sulky stand for travel;

a pivot frame for connecting said sulky frame to the frame, said pivot frame having a) a first ball end receivable by a first bracket connected to the frame, said first ball end being detachably connected to said first bracket by a first removable pin disposed through said first ball end and said first bracket, said pivot frame being vertically pivotable about said first removable pin and said first bracket;

b) means for connecting said sulky frame to said pivot frame, said means being a pin extending longitudinally backwards off a back end of said pivot frame, said pin being receivable by a hole in said sulky frame, said sulky frame being rotatably connected to said pivot frame by said pin; and, c) a second ball end receivable by a second bracket for connection to the apparatus frame and horizontally spaced from said first bracket, thereby minimizing longitudinal angular pivoting of said sulky stand, said second ball end being detachably connected to said second bracket by a second removable pin disposed through said second ball end and said second bracket, said pivot frame being pivotable about said second removable pin in said second bracket.

3. The sulky of claims 2 wherein said pin is supported in said hole in said sulky frame by a bearing, thereby producing increased rotation of said sulky frame with respect to said pivot frame.

4. The sulky of claim 3 further comprising:

a second wheel connected to said sulky frame to support said sulky frame and said sulky stand for travel.

5. A sulky for use with an associated self-propelled apparatus having a frame, said sulky comprising;

a sulky frame;

a sulky stand supported by said sulky frame;

a wheel connected to said sulky frame to support said sulky frame and said sulky stand for travel;

a pivot frame for connecting said sulky stand to the frame, said pivot frame having first and second ball ends receivable by first and second brackets for connection to the apparatus frame, said first ball end being detachably connected to said first bracket by a first removable pin disposed through said first ball end and said first bracket, said second ball end being detachably connected to said second bracket by a second removable pin disposed through said second ball end and said second bracket, said pivot frame being vertically pivotable about said first removable pin in said first bracket and said second removable pin in said second bracket; and, a pin extending longitudinally backwards off a back end of said pivot frame, said pin being receivable by a hole in said sulky frame, said sulky frame being rotatably connected to said pivot frame by said pin, said pin being supported in said hole in said sulky frame by a bearing, thereby producing increased rotation of said sulky frame with respect to said pivot frame.

6. The sulky of claim 5 further comprising:

a second wheel connected to said sulky frame to support said sulky frame and said sulky stand for travel.

* * * * *